Feb. 20, 1940. H. G. CLIFTON 2,190,772
DIRECTION SIGNAL SWITCH
Filed Feb. 20, 1939 2 Sheets-Sheet 1
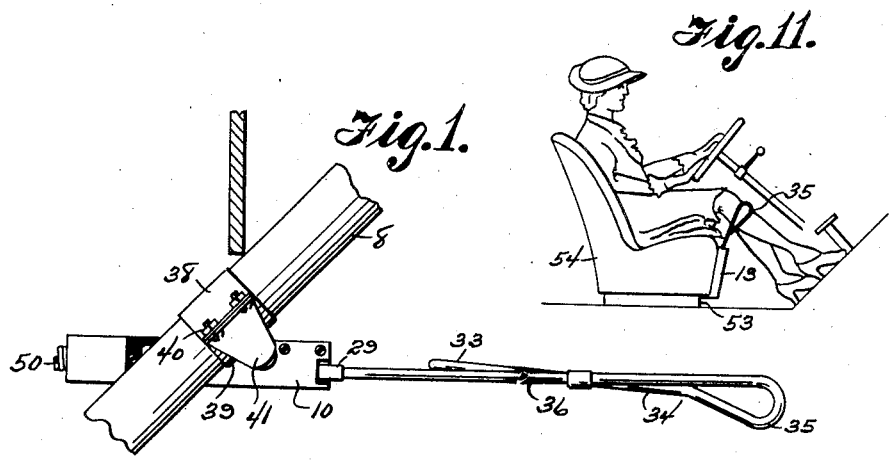
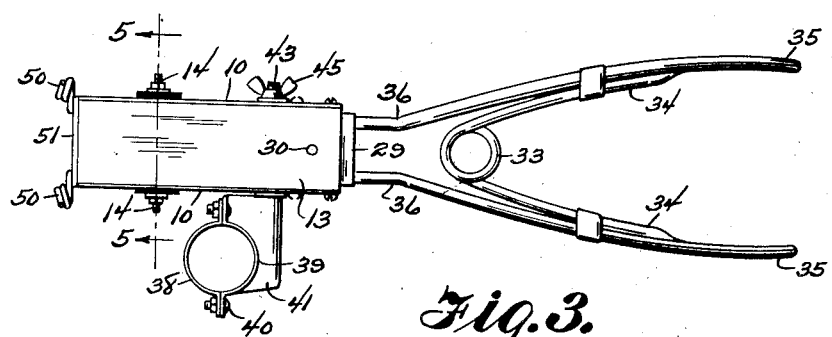
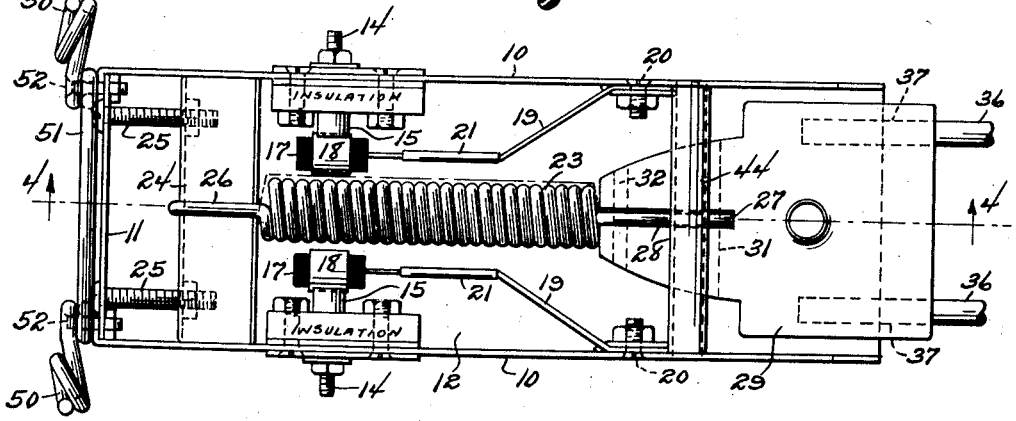
Harry G. Clifton
INVENTOR
BY Victor J. Evans & Co.
ATTORNEYS

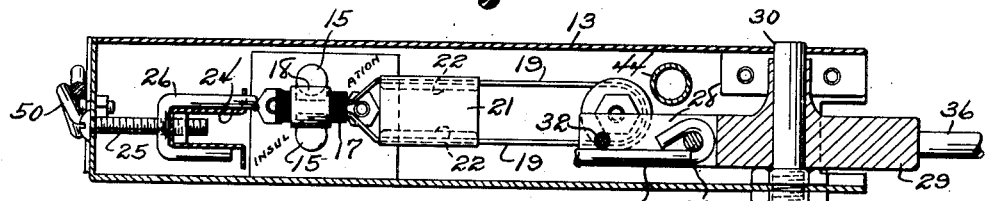

Patented Feb. 20, 1940

2,190,772

UNITED STATES PATENT OFFICE 2,190,772

DIRECTION SIGNAL SWITCH

Harry G. Clifton, Miami, Fla.

Application February 20, 1939, Serial No. 257,502

4 Claims. (Cl. 200—52)

This invention relates to direction signal switches and has for an object to provide a switch of this type adapted to be clamped to the steering column or secured to the instrument board in such position that the switch may be operated either by hand or by the right knee to close a selected turn signal circuit.

A further object is to provide a turn signal switch having a substantially U-shaped operating lever and having a pivotal connection with the steering column or instrument board as the case may be so that the lever may be rocked upward to locate it in close proximity to the lower part of the steering wheel where it may be readily operated with either hand, or if it be preferred, the lever may be rocked downward until it straddles the right knee in which position the switch may be operated by the knee without removing the hands from the steering wheel.

A further object is to provide a device of this character which may be attached to the seat of the vehicle when the steering wheel column is equipped with the shift lever.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification:

Figure 1 is a side elevation of a turn signal switch constructed in accordance with the invention and shown mounted on a steering column.

Figure 2 is a plan view of the switch shown in Fig. 1.

Figure 3 is a plan view of the switch, drawn to enlarged scale, with the cover plate removed to expose the working parts.

Figure 4 is a longitudinal sectional view of the switch taken on the line 4—4 of Figure 3 with the cover plate applied.

Figure 5 is a cross sectional view of the switch taken on the line 5—5 of Figure 2 drawn to enlarged scale.

Figure 6 is a side elevation of the steering wheel clamp of the switch.

Figure 7 is a cross sectional view of the clamp taken on the line 7—7 of Figure 6.

Figure 8 is a front elevation of a bracket for pivotally attaching the switch to the bottom flange of an instrument board.

Figure 9 is an end elevation of the clamp shown in Figure 8.

Figure 10 is a bottom plan view of the clamp shown in Figure 8.

Figure 11 is a side elevation of a modified form of the invention in which the device is shown applied to the seat and to the right leg of the driver below the knee.

Referring now to the drawings in which like characters of reference designate similar parts in the various views, the turn signal switch comprises a casing having side walls 10, an end wall 11, a bottom wall 12, and a cover plate 13. Secured to each side wall and insulated therefrom is a pair of binding posts 14, best shown in Figure 5, corresponding to a respective turn signal lamp. These binding posts terminate in heads 15 forming stationary switch contacts which are cut away at their confronting sides to provide arcuate contact surfaces 16 which are bridged by a respective movable switch contact.

Each movable switch contact comprises a cylindrical plug 17 of insulating material around which is disposed a metal band 18 adapted to nicely fit the contact surfaces 16 when the movable switch contact is shifted to circuit closing position. A pair of spring wire arms 19, best shown in Figures 3 and 4, are secured to the insulating plug 17 and are directed toward the adjacent side wall 10 of the casing and secured thereto through the medium of bolts 20 or other connectors. The spring arms hold the movable contact in open circuit position spaced from the respective stationary switch contacts 15. A metal plate 21 is disposed to bridge the spring arms 19 and the longitudinal edges of the plate are crimped upon the arms as shown at 22. The purpose of this plate is to provide an abutment against which a coil spring 23 may be swung to deform the spring arms and move the circuit closer to circuit closing position as will now be explained.

The helical spring 23 is formed of comparatively stiff spring material and is pivotally secured at the front end to a substantially U-shaped brace 24, which, as best shown in Figure 4, extends transversely between the side walls 10 of the casing near the closed end 11, and is adjustably secured to the closed end 11 through the medium of adjusting bolts 25. The front end of the spring is provided with a hook 26 which is hooked over the brace as best shown in Figure 4. By adjusting the adjusting bolts 25 the tension of the spring may be controlled.

The rear end of the spring is provided with a hook 27, also best shown in Figure 4, which is disposed in a slot 28 in a plate 29 which forms one end of an operating handle or switch lever and which is pivotally mounted in the casing through the medium of a vertically disposed pivot pin 30 which is secured to the bottom wall of the casing and extends through the cover plate thereof, as best shown in Figure 4. The hook 27 of the spring is engaged around a pin 31 which is passed transversely across the slot 28. A retaining screw 32 is also engaged transversely of the slot in advance of the hook to coact with the pin 31 in holding the hook in place.

When the plate 29 is swung on the pivot pin 30 laterally in one direction, the rear end of the spring 23 is swung laterally in the same direction and will impinge against a selected one of the plates 21, according to which direction the lever plate 29 is swung, and move the respective bridging band 18 of the circuit closer to circuit closing position against the respective stationary switch contacts 15.

The switch operating lever is preferably formed of spring wire and comprises a coil spring 33, the ends of the spring being directed in diverging relation to each other to provide arms 34 which form a substantially U-shaped grip for engagement with the right knee of the driver, the ends of the arms being formed with loops 35, best shown in Figure 1, which are adapted to engage the sides of the knee of the driver, the wire then being directed forwardly from these loops along the arms 34 to provide securing arms 36 which are terminally engaged in openings 37 formed in the plate 29, as best shown in Figure 3. The spring 33 permits the arms 36 being spread apart to yieldably hold the loops 35 against the side of the knee of the operator when the switch is to be operated in this manner by the use of the knee.

The switch is pivotally attached to the steering column 8 through the medium of a clamp shown best in Figures 1, 2, 6 and 7. The clamp comprises split ring sections 38 having flanges 39 secured together by bolts 40. A metal casing 41 is secured to the flanges of the lower section 39 and the casing is filled with hardened plastic material 42. A pivot pin 43 is imbedded at one end in the material and projects from one side of the casing. The pivot pin is of sufficient length to pass transversely through the casing walls 10 of the switch and within the casing a spacing sleeve 44 is sleeved upon the pin, as best shown in Figure 3. As shown in Figure 2, the pivot pin projects through the switch casing and is equipped exteriorly of the casing with a wing nut 45. By loosening the wing nut the switch may be rocked upon the pivot pin to dispose the operating lever arms 36 in such position as to comfortably engage the right knee of the driver whereupon the wing nut may be tightened to hold the lever in the desired adjusted position.

For pivotally attaching the switch to the bottom flange of an instrument board instead of to the steering wheel column, the clamp shown in Figures 8, 9 and 10 is employed. In this embodiment of clamp a U-shaped strap 46 is provided with openings 47 to receive securing bolts for mounting the clamp. A pivot pin 48 is engaged through the legs of the clamp and a wing nut 49 is threaded upon one projecting end of the pivot pin. The pivot pin 48 is passed through the spacing sleeve 44 of the switch casing 10, as previously described.

By referring to Figure 3 it will be seen that bumpers 50 in the nature of helical springs formed on the ends of a rod 51 are secured by bolts 52 or other connectors to the closed end of the casing.

In operation, if the driver wishes to use the switch device as a hand operated switch, the wing nut 45, or 49, as the case may be, is loosened to permit the switch casing being rocked upon the pivot pin to dispose the lever arms 36 within convenient reach of the driver's hands at the bottom of the steering wheel whereupon the wing nut may be tightened to maintain the device in this adjusted position. If, however, the driver wishes to use the device as a knee operated device, the previously described adjustment of the lever arms is made.

A modified form of the invention is shown in Figure 11, for use in connection with vehicles which have the shift gear lever on the steering column. The parts are identically the same as above described with the exception that the casing 13 is provided with an angle iron clamp 53, at the bottom, to secure the device to the seat 54 of the vehicle. The lever arms 36 are provided with loops 35 as previously described, to engage the driver's right leg below the knee.

In either case, when the lever arms are swung to the right or to the left the spring 23 will be swung in an opposite direction and move a respective movable switch arm to circuit closing position to energize a signal circuit for illuminating a signal lamp to designate the intended turn.

From the above description it is thought that the construction and operation of the invention will be fully understood without further explanation.

What is claimed is:

1. A direction signal switch comprising a casing having longitudinal walls, oppositely disposed stationary switch contacts on said walls, respective spring retracted movable switch contacts on the walls engageable with the stationary switch contacts, a helical spring extending longitudinally of the casing between said movable switch arms and connected at one end to the casing, and an operating lever pivotally mounted in the casing and connected to the other end of the spring, said operating lever having diverging spring arms projecting exteriorly of the casing and adapted to embrace a driver's knee for swinging the spring to move a selected movable switch arm into circuit closing position.

2. A direction signal switch comprising a casing having parallel side walls and an end wall, stationary switch contacts on the inner faces of the side walls, movable switch contacts cooperating with the stationary switch contacts and having spring arms secured to the inner faces of said side walls, a base extending transversely of the casing between the side walls, adjusting screws engaged through said end wall and said base for adjusting the position of the base, a helical spring secured at one end to said base and extending between said spring arms of the circuit closers, and an operating lever pivotally mounted in the casing and connected to the other end of the spring for moving the spring to deform selected ones of the spring arms, and move the respective circuit closer into circuit closing position.

3. A direction signal switch comprising a casing, pairs of stationary switch contacts disposed diametrically opposite each other in the casing, movable switch contacts having spring arms connected to the casing and each comprising a cylindrical plug of installation having a metal band sleeved thereon for bridging respective pairs of the stationary switch contacts, a spring connected at one end to the casing and extending between said spring arms for engaging the spring arms when the spring is swung laterally of the casing for moving the respective movable switch arm to circuit closing position, and an operating lever pivotally mounted in the casing and connected to the free end of the spring.

4. A direction signal switch comprising a casing, stationary switch contacts in the casing, movable switch contacts in the casing for cooperation with the stationary switch contacts, a spring hinged at one end to the casing and swingable laterally of the casing to engage selected ones of the movable switch contacts and move the same to circuit closing position, an operating lever pivotally connected to the casing and secured to the free end of the spring, and spring wire arms connected to the operating lever and disposed in diverging relationship for engagement with a driver's knee.

HARRY G. CLIFTON.